United States Patent [19]

van Heuven

[11] 3,996,318

[45] Dec. 7, 1976

[54] DYNAMIC MEMBRANE

[75] Inventor: Jan Willem van Heuven, Apeldoorn, Netherlands

[73] Assignee: Nederlandse Organisatie voor Toegepast-Natuurwetenschappelijk Onderzoek Ten Behoeve Van Nijverheid, Handel en Verkeer, The Hague, Netherlands

[22] Filed: Dec. 17, 1973

[21] Appl. No.: 425,185

[30]    Foreign Application Priority Data

Dec. 21, 1972    United Kingdom ............ 59086/72

[52] U.S. Cl. .................. 264/5; 210/23 H; 210/321 R; 210/500 M; 264/41
[51] Int. Cl.² ........................................ B01D 13/04
[58] Field of Search ................ 260/2.5 M, 2.1 E; 264/41, 49, 4, 5; 210/23, 22, 321, 500 M

[56]    References Cited
        UNITED STATES PATENTS

| | | | |
|---|---|---|---|
| 3,546,142 | 12/1970 | Michaels et al. | 210/500 X |
| 3,567,632 | 3/1971 | Richter et al. | 210/500 X |
| 3,647,086 | 3/1972 | Mizutani et al. | 210/500 |
| 3,657,144 | 4/1972 | Yoshida | 264/4 X |
| 3,744,642 | 7/1973 | Scala et al. | 210/500 |
| 3,764,526 | 10/1973 | King | 210/500 X |

Primary Examiner—Frank A. Spear, Jr.
Attorney, Agent, or Firm—Brumbaugh, Graves, Donohue & Raymond

[57]    ABSTRACT

The specification relates to thin, minute foils of a synthetic material obtained by an interfacial polycondensation reaction. More specifically, a process is described in which one reactive compound is dissolved in a non-aqueous solvent that has a boiling point below the boiling point of water. A second reactive compound is dissolved in water and the non-aqueous phase is then dispersed in the aqueous phase. A polycondensation reaction takes place at the interface of the two phases resulting in the non-aqueous phase being encapsulated by the polycondensation reaction product. The dispersion of the encapsulated non-aqueous phase in the aqueous phase is then heated to a temperature above the boiling point of the non-aqueous phase, but below the boiling point of water. The heating causes the encapsulating polymer to burst and to form thin, minute polymeric foils. The foils may be used directly or after some purification treatment for the formation of a dynamic membrane.

26 Claims, 4 Drawing Figures

DYNAMIC MEMBRANE

BACKGROUND OF THE INVENTION

Dynamic membranes are used in the purification of liquids, especially in the demineralization of water. Such dynamic membranes consist essentially of two components. The first component is a microporous, continuous structure such as ceramic material, sintered metal material and the like. If liquids are pressed through such a microporous, continuous structure, scarcely any impurity is held back.

It has therefore previously been proposed to cover said microporous structure with a second component comprising a thin layer of discrete particles. These particles have dimensions which in all directions are of the same order of magnitude.

The combination of the microporous structure and the layer of particles is called a "dynamic membrane".

If a liquid flows through such a dynamic membrane, part of the impurities are held back, but some of them traverse the membrane. If there are 100 parts of impurities present in the original liquid and 70 parts are retained and only 30 parts traverse the membrane, it is said that the retention factor, R, is 70%.

A higher valve for R indicates a better removal of impurities, i.e., less impurities, such as minerals, are found in the effluent that has passed through the dynamic membrane, e.g., water.

A high value for R, however, necessitates a very microporous structure and a very even distribution of the discrete particles which cover the microporous structure. Such a system results in a dynamic membrane that has a high flow resistance. Thus, in order to obtain a reasonable amount of the effluent, the pressure drop across the membrane should be high.

The amount of purified liquid is expressed by F = flux, which is measured in $m^3/m^2/sec$, i.e., the volume of effluent per area of dynamic membrane per second.

Although in principle a dynamic membrane can be used in removing impurities from any liquid, a well-known use is the demineralization of water, and more specifically, the desalination of water. The general use of a dynamic membrane is therefore called "reverse osmosis".

A high retention factor, R, indicates that the effluent, e.g., water, is devoided of minerals as much as possible.

An attractive feature of reverse osmosis with a dynamic membrane is that if, for one cause or another, the dynamic membrane becomes "blocked" (i.e., the flux, F, becomes low), the direction of flow of the liquid from the effluent side to the original side may be reversed for a short time. During such a reversal of flow, the particles are blown away from the microporous structure and whirl in the original liquid. If necessary, fresh particles can be added to the original liquid. If the flow of the liquid is again reversed to its original direction, the particles settle down on the microporous structure, and the dynamic membrane will again function as usual.

A convenient way to "build up" a dynamic membrane is to have one side of the microporous structure in contact with the liquid to be purified. Then the discrete particles are dispersed in this liquid or a dispersion of the particles is added to the liquid. Finally, pressure is applied to the liquid. The liquid starts to flow through the porous structure, moving the particles into the openings of the microporous structure and forming the dynamic membrane.

The nature of the microporous structure is not important provided the structure is microporous. Of course, the microporous structure should not dissolve in the liquid to be filtered. The microporous structure may consist of an inert material, or it may be made of an ion exchanging material.

The discrete particles should also be insoluble in the liquid to be filtered. The form of discrete particles used in the prior art is not optimally suited to the formation of dynamic membranes. The particles should seal the micropores, but they do not necessarily have to have dimensions of the same order of magnitude in all directions. Moreover, discrete particles are rigid, and therefore, they do not optimally seal the micropores.

It is therefore preferred that discrete particles are replaced by thin foils. Such foils have a structure so that one dimension of the foil is much smaller than the other two dimensions. However, the two larger dimensions should be such that the micropores are sealed. In other words, in the direction perpendicular to the two larger dimensions the foils are thin.

During reverse osmosis, a dynamic membrane comprised of thin foils offers much less resistance to the flow of the liquid so that normal flux is attained at a lower pressure. In other words, if pressures are the same as usual the flux of the dynamic membrane of the present invention is higher than that of a dynamic membrane with the discrete particles which are more or less spherical.

The dynamic membranes of the present invention have a quite acceptable retention factor.

SUMMARY OF THE INVENTION

The invention relates to a process for making synthetic foils useful in dynamic membranes. This process is very flexible and the foils can be tailored to the specific use contemplated.

The process is characterized by an interfacial polymerization reaction between two reactants, A and B. The interfacial polymerization reaction is accomplished by dispersing a non-aqueous solution of reactant B in water, which water can contain or later will contain reactant A. The non-aqueous phase should be substantially immiscible with water and have a boiling point below that of water.

The polymerization reaction takes place at the interface of the phases and results in the non-aqueous phase being encapsulated by the polymer which is formed.

After the interfacial polymerization reaction is complete, the polymer-encapsulated non-aqueous phase can be filtered and redispersed in water, if desired. The dispersion is then heated to a temperature above the boiling point of the non-aqueous phase but below the boiling point of water. The heating step results in the rupture of the encapsulating polymer, and thin solid foils of the polymer are formed.

DETAILED DESCRIPTION OF THE INVENTION

Figure 1:
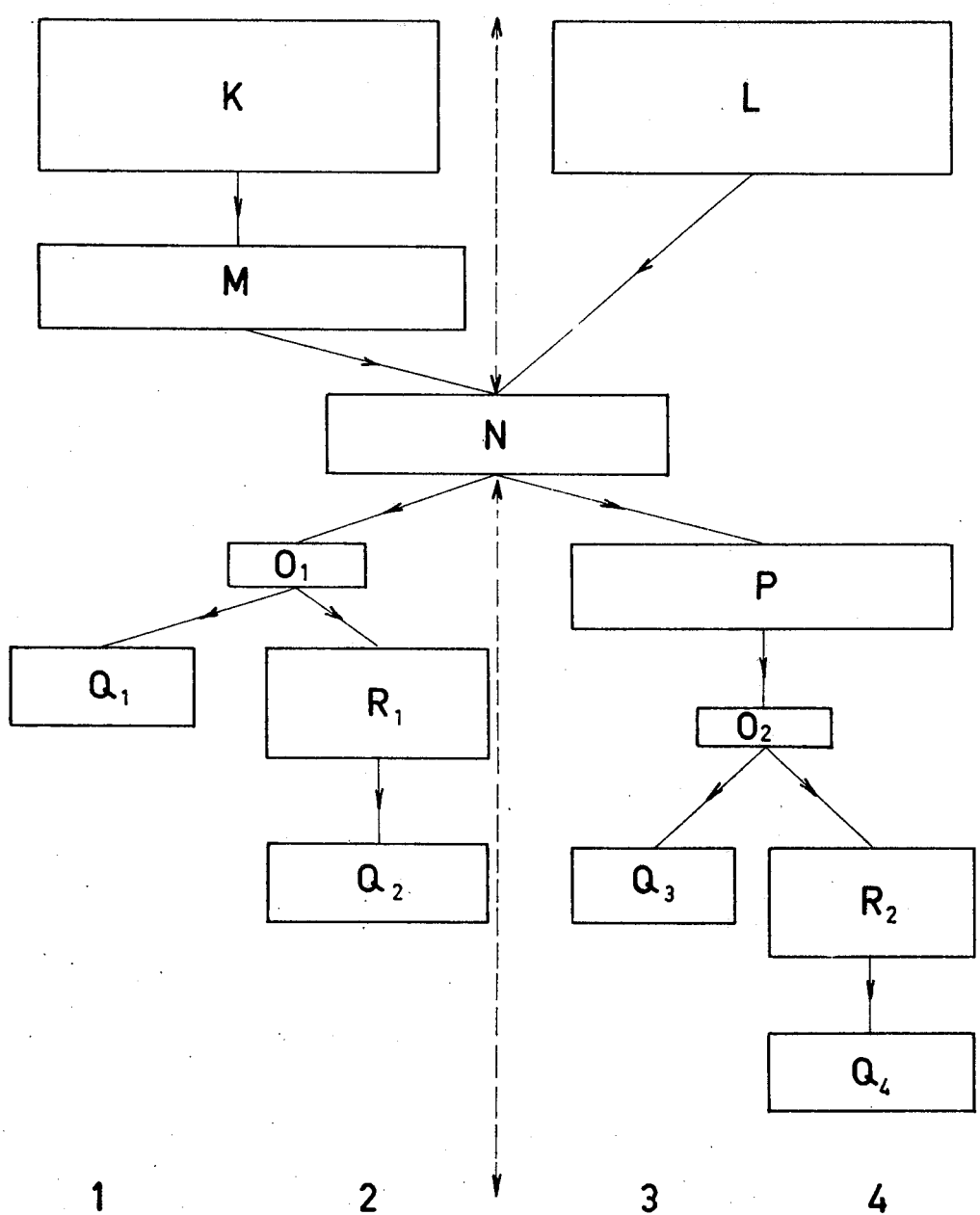
FIG. 1 is a block diagram illustrating the various steps of the process of the present invention.

There are a number of procedures, differing very little from each other, which attain the objective desired. As will appear from the scheme of FIG. 1, the process of the invention takes place in two stages. In stage $\alpha$, the interfacial polymerization reaction takes place, and a non-aqueous phase encapsulated by polymer is obtained.

Method I

A non-aqueous (mostly organic) solution of reactant B is dispersed in water.

Depending on the nature of the interfacial polymerization reaction to be implemented, an acid acceptor or a buffer can be added to the dispersion. Kinetic and catalytic aspects here determine type and pH range.

On dispersing, a surface active compound can be used, if desired.

An aqueous solution of a reactant A is then added to the dispersion. To control the polymerization reaction conditions, a buffer or acid acceptor and/or surface active compound may have been added to this aqueous solution of reactant A.

Now a reaction will take place at the interface of the water and the non-aqueous phase.

Method II

In this method, a non-aqueous (mostly organic) solution of reactant B is dispersed in water in which reactant A has previously been dissolved. Depending on the nature of the interfacial polymerization reaction, an acid acceptor or a buffer can be added. In this case, however, the acid acceptor or buffer is added before the preparation of the dispersion.

When dispersing, a surface active compound can be used, if desired.

Now the reaction will take place at the interface of the water and the non-aqueous phase.

In stage $\beta$, the encapsulated non-aqueous phase obtained in stage $\alpha$ is prepared to be brought into the reverse osmosis apparatus by one of the following methods:

Method 1

The non-aqueous phase, which is encapsulated by the polymer and which has a boiling point below that of water, is evaporated by heating the dispersion obtained in stage $\alpha$ to a temperature between the boiling points of the water and the non-aqueous phase. By heating the dispersion, the spherical polymer foils formed in stage $\alpha$ burst open.

The aqueous dispersion of thin polymer foils obtained is immediately brought into the reverse osmosis apparatus. The buffer or acid acceptor and surface active compound used, if any, are also brought into the reverse osmosis apparatus at the same time.

Method 2

Starting with the dispersion of thin polymer foils obtained in Method 1, the buffer or acid acceptor and surface active compound, if any, is removed by filtering and washing before the polymer foils are brought into the reverse osmosis apparatus.

The foils are then redispersed in water and the dispersion is brought into the reverse osmosis apparatus. When redispersing, it may be necessary to add again a surface active compound.

Method 3

The dispersion in water of the non-aqueous phase encapsulated by polymer which is obtained in stage $\alpha$ is firstly filtered and washed to remove the residue of reactants, buffer, acid acceptor and surface active compound added, if any.

The material thus obtained, consisting of non-aqueous phase encapsulated by polymer, is again taken up in water.

Now as in Method 1, the non-aqueous phase is evaporated and the product obtained is immediately brought into the reverse osmosis apparatus.

When this product is again taken up in water, new buffer material or a new acid acceptor can be added, if desired. Moreover, it may be necessary to add again a surface active compound.

Method 4

As with Method 3, the polymer encapsulated non-aqueous phase if firstly filtered and taken up again in water before it is evaporated.

The same observations made in Method 3 regarding the addition of buffers, acid acceptors and surface active compounds also hold here.

After evaporation, the material is not immediately brought into the reverse osmosis apparatus, but as with Method 2, a filtration is applied first.

After washing and redispersing the foils in water, the residue is brought into the reverse osmosis apparatus. When redispersing, it may be necessary again to add a surface active compound.

The above-described scheme is illustrated in FIG. 1.

The numbers 1–4, inclusive, at the bottom of FIG. 1 indicate the four methods for getting from the dispersion to the dynamic membrane. Stage $\alpha$ is indicated by steps K, M and N or steps L and N. Stage $\beta$ is indicated by steps $O_1$ and $Q_1$; $O_1$, $R_1$ and $Q_2$; P, $O_2$ and $Q_3$; and P, $O_2$, $R_2$ and $Q_4$. These steps are more fully described below.

Method I encompasses steps K, M and N. K means that the non-aqueous phase, in which reactant B is dissolved, is dispersed in water. Compounds useful for preparing dispersions, such as buffers, acid acceptors, surface active compounds and the like, may also be dissolved in the water.

Step K is followed by step M, namely the addition of a water solution of reactant A to the dispersion formed in step K. The water solution of reactant A may also contain auxiliary compounds, if desired.

Steps K and M lead to N which describes the non-aqueous phase which is encapsulated by the polymer. These droplets of the non-aqueous phase enveloped by the polymer are formed by the reaction between reactants A and B. The droplets are in the form of a dispersion in water.

Method II encompasses steps L and N. L means that the non-aqueous solution of reactant B is dispersed in water in which reactant A is dissolved. Step L results in N which is described above.

From N, one can use methods 1–4 described above to obtain the dynamic membrane.

Method 1 is described by steps $O_1$ and $Q_1$. According to $O_1$, one may evaporate the non-aqueous phase immediately by heating the dispersion obtained in step N to a temperature above the boiling point of the non-aqueous phase but below the boiling point of water. Step $O_1$ results in the rupture of the encapsulated non-aqueous phase and the formation of a multitude of small thin foils. These foils are still dispersed in water and they may be used immediately in the reverse osmosis apparatus (Step $Q_1$).

Method 2 is described by steps $O_1$, $R_1$ and $Q_2$. According to step $R_1$, the thin polymer foils obtained in step $O_1$ are washed and redispersed in water. The purified foils are then brought into the reverse osmosis apparatus (Step $Q_2$).

Method 3 is described by steps P, $O_2$ and $Q_3$. In step P, the droplets of encapsulated non-aqueous phase formed in step N are first filtered and then taken up again in water.

According to step $O_2$, the dispersion obtained by step P is then heated to a temperature above the boiling point of the non-aqueous phase but below the boiling point of water. Step $O_2$ results in the rupture of the encapsulated non-aqueous phase, the evaporation of the non-aqueous solvent, and the formation of the polymer foils. The dispersion of thin foils formed in step $O_2$ may be immediately brought into the reverse osmosis apparatus (Step $Q_3$).

Method 4 is described by steps P, $O_2$, $R_2$ and $Q_4$. Steps P and $O_2$ are described above. According to step $R_2$, the thin polymer foils obtained in step $O_2$ are filtered, washed and redispersed in water. The purified thin foils are then brought into the reverse osmosis apparatus (Step $Q_4$).

All of the polymerization reactions have been carried out at room temperature, but deviations are allowed, provided the boiling point of the non-aqueous phase is not surpassed.

Dispersion can be accomplished in a number of ways, known per se, for instance, by mechanical means such as stirring or by ultrasonic means. Also, a gas can be passed through both phases. In general, shaking does not lead to a good dispersion unless a specialized apparatus is used.

Type of interfacial polycondensation products
Linear polymers

| Group No. | Product name | Reactant A water phase | Reactant B non-aqueous phase |
|---|---|---|---|
| 1 | polyamide | diamine | dicarboxylic acid chloride |
| 2 | polybisamide | diamine | oxalyl chloride |
| 3 | polyurea | diamine | phosgene |
|  |  | diamine | dicarbamyl chloride |
|  |  | diamine | diisocyanate |
| 4 | polybisurea | hydrazine | diisocyanate |
| 5 | polyurethane | diamine | di(chloroformate) |
|  |  | diol | diisocyanate |
| 6 | polyester | diol | dicarboxylic acid chloride |
| 7 | polybisester | diol | oxalyl chloride |
| 8 | polycarbonate | diol | di(chloroformate) |
|  |  | diol | phosgene |
| 9 | polymonoacylhydrazine | dihydrazide | dicarboxylic acid chloride |
| 10 | polydiacylhydrazine | dihydrazide | dicarboxylic acid chloride |
|  |  | hydrazine | dicarboxylic acid chloride |
| 11 | polybisdiacylhydrazine | oxalic acid dihydrazide | dicarboxylic acid chloride |
| 12 | polysemicarbazide | dihydrazide | diisocyanate |
| 13 | polyacylsemicarbazide | dihydrazide | diisocyanate |
| 14 | polybisacylsemicarbazide | oxalic acid dihydrazide | diisocyanate |
| 15 | polyurethaneacylsemicarbazide | hydroxyacylhydrazine | diisocyanate |

(One or both amino groups may also be secondary amino groups, e.g., piperazine).

The last group, no. 15, gives an example of a polymer with two different chains between organic groups R and R' (defined below), viz., the urethane group (see no. 5) and the acylsemicarbazide group (see no. 13).

A large number of such varieties can be synthesized, but the following categories can be stated:
a. alternating copolymer (such as group no. 15)
b. random copolymers, and
c. block copolymers.

These categories can be manufactured in known ways, e.g., category (b) can be made by adding more than one reactant in one or two phases, and category (c) can be made by starting from prepolymerized reactants with a low degree of polymerization.

Crosslinked polymers

When one of the two or both reactants have more than two functional groups, a crosslinked polymer is produced by the interfacial polycondensation reaction.

The same scheme given in the section entitled "Linear polymers" above can be applied for this category of interfacial polycondensation reactions, with the understanding that three-dimensional product structures are produced.

Figure 2:
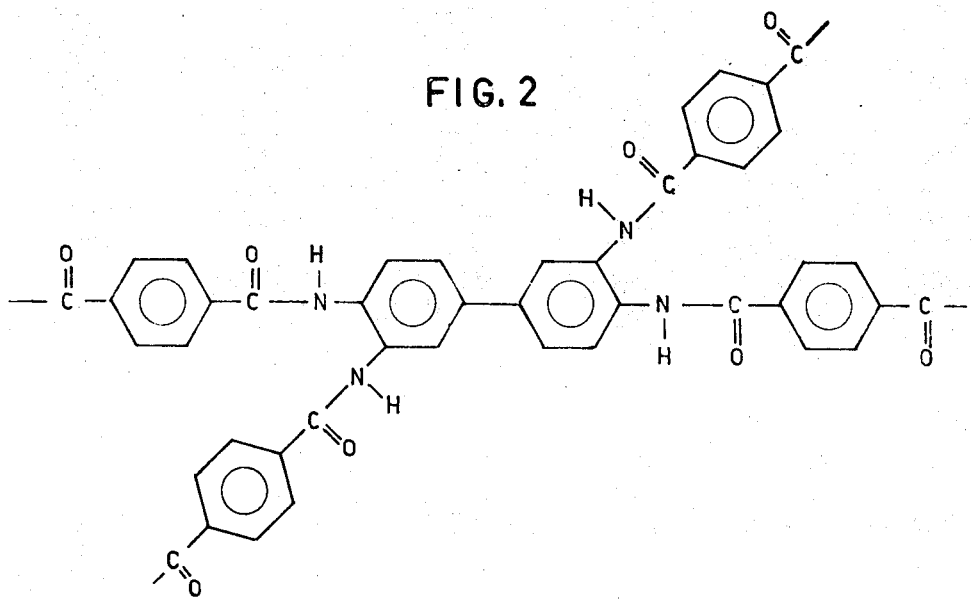
FIG. 2 is a diagrammatic illustration of the structural linkage in a polymer prepared by reacting 3,3'-diaminobenzidine and terephthaloyl chloride.

For the group resembling polyamides some examples are given:

One example is the case in which reactant A is 3,3'-diaminobenzidine and reactant B is terephthaloyl chloride. The product is shown in FIG. 2.

Figure 3:
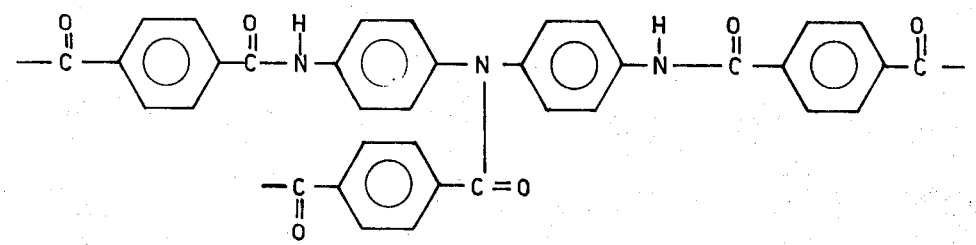
FIG. 3 is a diagrammatic illustration of the structural linkage in a polymer prepared by reacting 4,4'-diamino-diphenyl amine and terephthaloyl chloride.
Figure 4:
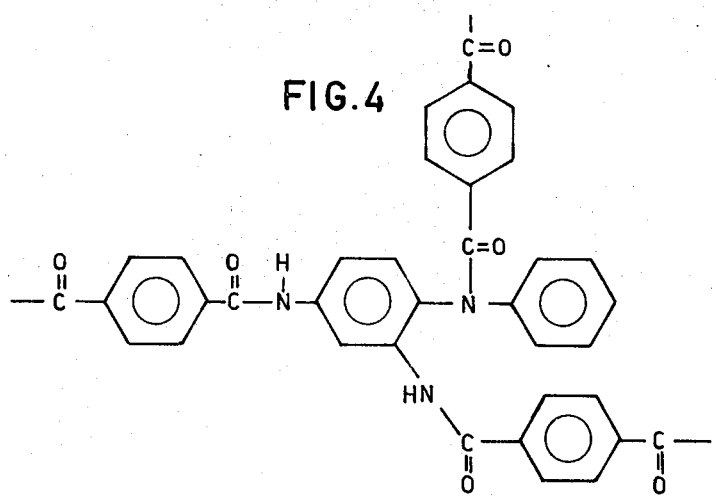
FIG. 4 is a diagrammatic illustration of the structural linkage in a polymer prepared by reacting 2,4-diamino-diphenylamine and terephthaloyl chloride.

Other examples are the formation of the product shown in FIG. 3 from 4,4'-diamino-diphenylamine and terephthaloyl chloride and the product shown in FIG. 4 from 2,4-diamino-diphenylamine and terephthaloyl chloride.

Such an extension can be applied to all groups specified in the section entitled Linear polymers above. Thus, the group of diols can be extended to polyols such as monosaccharides (e.g., glucose), small polysaccharides (e.g., sucrose), polyhydroxybenzenes (e.g., phloroglucinol) and the like.

The reaction of such polyols with a diisocyanate produces polymers which can have intricate crosslinked structures. Such polymers contain the urethane group (see the section entitled Linear polymers Group No. 5).

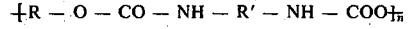

Autopolymerization of diisocyanates

In several of the syntheses mentioned in the section entitled Linear polymers above use is made of diisocyanate as one of the reactants. Diisocyanates, like, i.a., the dicarboxylic acid chlorides, undergo a hydrolysis side reaction which is less favorable to the polycondensation reaction:

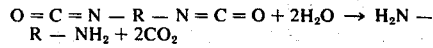

The product of the diisocyanate hydrolysis is a diamine, and in the section entitled Linear polymers, it has been shown already that the reaction between a diisocyanate and a diamine yields a polyurea as the product.

So, the diisocyanate hydrolysis provides a possibility for implementing an interfacial polymerization with one reactant as starting material. For this purpose, a solution of the diisocyanate in the organic solvent is dispersed in water. At the interface of the two phases the following reactions occur:

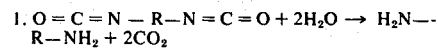

2. $O=C=N-R-N=C=O + H_2N-R-NH_2 \rightarrow \{R-NH-CO-NH\}_n$

As regards the remaining details, this interfacial polymerization reaction takes place in the same way as described above.

Description of the polymerization reactants

For a great part, the selective permeable qualities of a membrane material are determined by the capacity of the material to bind water by the hydrogen bridge linkage. The forms of the chain units between the organic groups R and R' dealt within the previous section (and described further below) have the qualities required for this hydrogen linkage, but if this form of hydrogen linkage is to function correctly, the organic groups R and R' have to meet certain requirements:

The reactant in the water phase has to be described as:

$X - R - X$ for the linear case, and $R(X)_n$ wherein $n > 2$ for the crosslinked case.

In the above formulae, X is the reactive group involved in the polymerization and R is the organic group.

As can be seen from the tables of the section entitled "Types of interfacial polycondensation products" above, X can stand for the following reactant groups in the water phase: $-NH_2$; $>NH$ or $-NH-A$; $-OH$; $-NH-NH_2$; $>N-NH_2$; or $-CO-NH-NH_2$; wherein A stands for a group consisting preferably of not more than one carbon atom or an aromatic ring.

Organic group R has to meet the following requirements:

1. R should preferably be cyclic. This opens up possibilities for aromatic as well as aliphatic cyclic units, but the following considerations preferably should be applied.
1.1 R should preferably be aromatic.
1.1.1 R should preferably be an aromatic nucleus:
   a. composed of maximally six C atoms,
   b. with hetero atoms (O, N, S), if any, totalling maximally six atoms in the nucleus. (In case a >N—H group is incorporated in the nucleus, it is a reactive group, i.e., a group involved in the polymerization reaction.)
1.1.2 R may consist of maximally two condensed aromatic nucleii. If desired, each nucleus may be composed of maximally six atoms (e.g., in the event both nucleii consist of six C atoms, it concerns a naphthalene unit).
1.1.3 R may consist of maximally two coupled aromatic rings, if desired, each composed of maximally six atoms.
1.1.3.1 If desired, the coupling may be direct, i.e., it may consist of one carbon-carbon linkage.
1.1.3.2 If desired, the aromatic nucleii may be coupled, by a group consisting of maximally five atoms, such as $-CH_2-$, $-SO_2-$, $-CO-$, $-NH-$, $-S-$,

and $-CHOH-$. The groups $-NH-$ and $CHOH-$ are reactive, and this implies that in such a case a crosslinked polymer is produced upon polymerization. An example of such a compound 4,4'-diaminodiphenylamine.

1.2 If desired, R may be an aliphatic nucleus with >NH groups in the nucleus. This nucleus is not allowed to contain more than six atoms. An example of such a compound is piperazine.
2. R may be left out, if desired, e.g., in hydrazine.

The reactant in the non-aqueous phase can be described as:

$Y-R'-Y$ for the linear case, and $R'(Y)_m$ wherein $m > 2$ for the crosslinked case.

In the above formulae, Y is the group involved in the polymerization, and R' is the organic group.

As can be seen from the tables of the section entitled reactant group selected from the following: $-CO-Cl$; $-NH-CO-Cl$; $-N=C=O$; or $-O-CO-Cl$.

The organic group R' has to meet the following requirements:

1. R' should preferably be aromatic.
1.1 R' should preferably be an aromatic nucleus, composed of maximally six atoms.
1.2 If desired, the aromatic nucleus may contain hetero atoms (O, N, S), but the total number of atoms composing the nucleus must not exceed six.
1.3 If desired, R' may consist of maximally two condensed aromatic nucleii, each nucleus being composed of maximally six atoms.
1.4 If desired, R' may consist of maximally two coupled aromatic nucleii, each composed of maximally six atoms.
1.4.1 The coupling may be direct, i.e., it may consist of one carbon-carbon linkage.
1.4.2 If desired, the aromatic nucleii may be coupled by a group consisting of maximally five atoms, which group should not be reactive, however, with the functional groups that characterize the reactant of the non-aqueous phase.
2. R' may be absent, if desired, such as in oxalyl chloride.

Among the possible reactants in the non-aqueous phase is phosgene. Phosgene, however, cannot be placed in any of the categories stated above.

Substituents

All the organic groups, R and R', may be provided with preferably non-ionic substituents with a maximum of seven atoms, inclusive of the hydrogen atoms. Totally, no more than two substituents are allowed per cyclic or aromatic nucleus.

Ionic substituents are allowed only in a very small number and preferably should be avoided.

All of these reaction possibilities for the interfacial polymerization are known, and the conditions which are necessary to obtain good interfacial polymers are also known, i.e., concentrations, temperatures and additions.

Characteristics of the polymer as a whole

The polymer as a whole has to meet the following requirements:
It must not show a very high degree of intermolecular interaction.
The degree of polymerization must be such that the material is able to form a film.
The material must not be soluble in water or in the nonaqueous solvent used in its preparation.

Characteristics of the non-aqueous solvents

The non-aqueous solvents used in the interfacial polycondensation reactions have to meet the following requirements:

The boiling point must be lower than that of water under the prevailing circumstances.

It must be immiscible or only slightly miscible with water.

The polymer formed must neither dissolve in nor highly swell under the influence of the solvent.

I.a., the following solvents are appropriate:

| Solvent | Boiling-point °C | Solubility in g/100 cc water |
|---|---|---|
| hexane | 69.0 | 0.0138 (15.5° C) |
| benzene | 80.1 | 0.082 (22° C) |
| carbon tetrachloride | 76.8 | 0.08 (20° C) |
| cyclohexane | 81.4 | insoluble |
| 1,3-cyclohexadiene | 80.5 | insoluble |
| 1,4-cyclohexadiene | 87 | insoluble |
| 1-hexene | 63.5 | insoluble |
| pentane | 36.2 | 0.036 (16° C) |
| 1-pentene | 30.0 | insoluble |
| cyclopentene | 44.2 | insoluble |
| chloroform | 61.3 | 1.0 (15° C) |
| 1,1-dichloroethylene | 37 | insoluble |
| 1,2-dichloroethylene | 60.1 cis, 48.4 (trans) | insoluble |
| trichloroethylene | 87 | 0.1 |
| diisopropylether | 69 | 0.2 |
| furan | 32 | 1 |

Acid acceptors

In case an acid (mostly HCl) is released in the polycondensation reaction, it is desirable to use an acid acceptor in order to reach a sufficiently high degree of polymerization. It is required that the acid acceptor reacts only slightly or not at all with the reactants. Otherwise, the acid acceptor would act to a high degree as a terminator in the polymerization reaction. For this reason, the term acid acceptor when applied to amines, which are known to be acid acceptors, is limited to mean the tertiary amines.

As acid acceptor, i.a., the following bases can be used: NaOh, NaHCO$_3$, Na$_2$CO$_3$, NaC$_2$H$_3$O$_2$, Na$_2$S, Borax, KOH, K$_2$CO$_3$, CaCO$_3$, MgO, Ca(OH)$_2$, tertiary amines (e.g., (C$_2$H$_5$)$_3$N), and quaternary ammonium bases.

Buffer systems

In some cases it may be necessary to maintain a constant pH during the interfacial polymerization; therefore, a buffer must be used instead of only an acid acceptor. A buffer is needed, for example, in the case of reactions between aromatic polyamines (such as diaminobenzene) and acid chlorides. These reactions do not proceed very well with a basic acid acceptor, but they do proceed well in acid milieu because the acid catalyzes the reaction. On the other hand, the milieu must not become too acidic because then the amine is practically completely protonated (—NH$_2$ → —NH$_3$+) so that the reaction no longer takes place.

There is an optimum pH for the reaction and this must be maintained with a buffer. In some cases, the amine itself, provided it is present in sufficient surplus, can be used as the basic component of the buffer.

Some examples of useful buffers are as follows:

| acid | base | pH range |
|---|---|---|
| oxalic acid | oxalate | 1 – 1.5 |
| o-phosphoric acid | dihydrophosphate | 1.9 – 2.4 |
| formic acid | formate | 3.5 – 4.0 |
| acetic acid | acetate | 4.5 – 5.0 |
| hydrophthalate | phthalate | 5.3 – 5.8 |
| hydrophosphate | phosphate | 7.0 – 7.5 |

-continued

| acid | base | pH range |
|---|---|---|
| hydrochloric acid | borax | 8.0 – 9.0 |

For a sufficiently great buffer capacity, a minimum quantity, depending on the reaction concentrations, is required. In some cases, the choice is also determined by the solubility of a certain buffer system.

Surface active substances

Surface active compounds can be added to the reaction medium to attain a better dispersion of the non-aqueous phase into the aqueous phase. Here, too, it is required that these compounds not react with one of the reactants.

Examples of the surface active compounds to be used are as follows:
sodium laurylsulphate
sodium oleate
hexadecyltrimethyl ammonium bromide
hexadecylpyridine chloride
dialklysulphates These conditions with regard to solvents, acid acceptors, buffers, surfactants are again conventional.

Examples of possible reactant combinations

For the examples, the same order will be maintained as stated in the Tables of the section entitled Linear polymers above.

Group 1. polyamides
a. diamines (aqueous phase)
 diamine
 1,3-diaminobenzene
 1,4-diaminobenzene
 2,4-diaminotoluene
 2,5-diaminotoluene
 2,6-diaminotoluene
 3-ethyl-m-phenyleneamine
 4,6-dimethyl-m-phenyleneamine
 2,4-diaminoanisol
 2,5-diamino-nitrobenzene
 2,6-diaminopyridine
 benzidine
 3,3'-dimethylbenzidine
 3,3'-dimethoxybenzidine
 piperazine
 2-methylpiperazine
 trans-2,5-dimethylpiperazine
 cis-2,6-dimethylpiperazine 2-phenylpiperazine
b. dicarboxylic acid chlorides (non-aqueous phase)
  dicarboxylic acid chloride
  terephthaloyl chloride
  isophthaloyl chloride
  3,3'-dibenzoyl chloride
  4,4'-dibenzoyl chloride
  pyridine-2,5-dicarbonyl chloride
  pyridine-3,5-dicarbonyl chloride
  pyridine-2,4-dicarbonyl chloride
  pyridine-2,6-dicarbonyl chloride
  pyrazine-2,5-dicarbonyl chloride
  2,6-dimethyl-3,5-pyridine dicarbonyl chloride
  fumaric acid chloride
Group 2. polybisamides
  a. diamines (aqueous phase) (see group 1)
  b. oxalyl chloride (non-aqueous phase)
Group 3. polyureas
  a. diamines (aqueous phase) (see group 1)
  b. phosgene (non-aqueous phase)
  c. dicarbamyl chloride (non-aqueous phase)
A dicarbamyl chloride can be prepared from a secondary diamine and an excess of phosgene

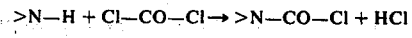

From piperazine and phosgene:

From 1,4-bis(methylamino)-benzene and phosgene:

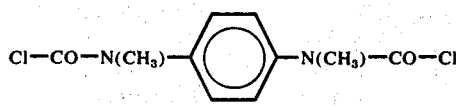

From 1,4-bis(phenylamino)-benzene and phosgene:

d. diisocyanates (non-aqueous phase)
A diisocyanate can be prepared from a diamine and phosgene:

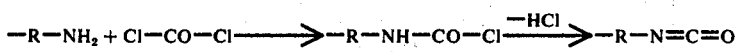

Such diisocyanates can be, for example:
2,4-toluenediisocyanate
2,5-toluenediisocyanate
2,6-toluenediisocyanate
p-phenylenediisocyanate
m-phenylenediisocyanate
4,4'-bisphenylenediisocyanate
3,3'-dimethyl-4,4'-bisphenylenediisocyanate
3,3'-dimethoxy-4,4'-bisphenylenediisocyanate
Group 4. polybisureas
  a. Diisocyanates (non-aqueous phase) (see group 3)
  b. hydrazine (aqueous phase)

Group 5. polyurethanes
  a. diamines (aqueous phase) (see group 1)
  b. dichloroformates (non-aqueous phase)
    dichloroformate
    1,4-phenylenebischloroformate
  c. diisocyanates (non-aqueous phase) (see group 3)
  d. diols (aqueous phase)
    hydroquinone
    resorcinol
    catechol
    methylhydroquinone
    4-methylcatechol
    2-methylresorcinol
    3-methoxycatechol
    2,4-dihydroxyacetophenone
    2,5-dihydroxyacetophenone
    2,6-dihydroxyacetophenone
    0,0'-biphenol
    4,4'-dihydroxybiphenyl
    2,3-dihydroxypyridine
    2,6-dihydroxypyridine
    4,6-dihydroxypyridine
Group 6. polyesters
  a. diols (aqueous phase) (see group 5)
  b. dicarboxylic acid chlorides (non-aqueous phase) (see group 1)
Group 7. polybisesters
  a. diols (aqueous phase) (see group 5)
  b. oxalyl chloride (non-aqueous phase)
Group 8. polycarbonates
  a. diols (aqueous phase) (see group 5)
  b. dichloroformates (non-aqueous phase) (see group 5)
  c. phosgene (non-aqueous phase)
Group 9. polymonoacylhydrazines
  a. dihydrazines (aqueous phase)
    dihydrazine
    bishydrazine
    N,N'-diaminopiperazine
    N,N'-diamino-trans-2,5-dimethyl-piperazine
    1,3-phenylenedihydrazine
    1,4-phenylenedihydrazine
  b. dicarboxylic acid chlorides (non-aqueous phase) (see group 1)
Group 10. polydiacylhydrazines
  a. dihydrazides (aqueous phase)
    dihydrazide
    isophthalic acid dihydrazide
    terephthalic acid dihydrazide
    2,5-pyridine dicarboxylicdihydrazide
    2,6-pyridine dicarboxylicdihydrazide
    pyrazine-2,5-dicarboxylicdihydrazide
A dihydrazide can be prepared according to the following reaction:

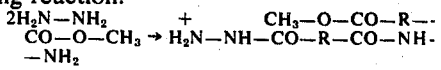

b. dicarboxylic chlorides (non-aqueous phase) (see group 1)
  c. hydrazine (aqueous phase)
Group 11. polybisdiacylhydrazines
  a. dicarboxylic chlorides (non-aqueous phase) (see group 1)
  b. oxalic acid dihydrazide (aqueous phase)

Group 12. polysemicarbazides
  a. diisocyanates (non-aqueous phase) (see group 3)
  b. dihydrazines (aqueous phase) (see group 9)
Group 13. polyacylsemicarbazides
  a. dihydrazides (aqueous phase) (see group 10)
  b. diisocyanates (non-aqueous phase) (see group 3)
Group 14. polybisacylsemicarbazides
  a. diisocyanates (non-aqueous phase) (see group 3)
  b. oxalic acid dihydrazide (aqueous phase)
Group 15. polyurethane acylsemicarbazides
  a. diisocyanates (non-aqueous phase) (see group 3)
  b. hydroxyacylhydrazine (aqueous phase)

Dimensions of the foils

The dimensions of the foils depend on the concentration of the reactants of A and B, the amount of dispersion and the like.

One condition is that the foil be a solid, one dimension being at least 10 times smaller than the dimensions perpendicular to it. This should be kept in mind with regard to what follows.

The dimensions in the plane of the foils may exceed 1 mm if coarse dispersed particles are present, but this should be avoided as much as possible. The dimensions may also become smaller than 0.1 $\mu$m, for instance, because of tearing as a result of the stirring. This should also be avoided. Suitable dimensions are in the range of 1 $\mu$m to 1 mm.

Regarding the thickness of the foils, the dispersion procedure must be such that little or no foils are formed with a thickness above 10 $\mu$m. Suitable thicknesses are 1 $\mu$m or smaller. Generally, the process must be carried out in such a way that at least 70% of the foils lie within the above-mentioned range.

GENERAL EXAMPLE

The various tests carried out by the methods described above are tabulated in Table A.

Column (b) of Table A specifies to which group the polymer formed belongs (see the tables of the section entitled Linear polymers for the division in groups). It is also indicated whether a linear (L) or a crosslinked (N) polymer has been formed.

In column (c), the working procedure followed in preparing the polymers is specified, for example, I, 1 means that methods I and 1 were used.

When method I is used, the non-aqueous phase (see column f), in which reactant B (see column e) has been dissolved, is dispersed in 1500 cc of water. In test number 18 only 500 cc of water was used. 500 cc of an aqueous solution of reactant A (see column d) which contains, in some cases, an acid acceptor (see column m) or a buffer (see column n) is then added to the above-described dispersion.

The dispersion of the non-aqueous phase in the aqueous phase was obtained by stirring with the aid of a Temp-Fluid TF 25 manufactured by Oskar Krieger at Muttinz in Switzerland. The speed of the stirrer used to obtain the dispersion is listed in column 1 in rotations per minute (rpm).

The interfacial polymerization reactions were then carried out at ambient temperatures. After the reactions were completed but before evaporation of the non-aqueous phase, the sizes of the particles were determined (see column k).

Polymer foils were formed during all tests specified in Table A.

EXAMPLE I

With the polymer foils formed during tests nos. 3 and 6 (see Table A, column a), dynamic membranes were formed in a reverse osmosis apparatus. For both tests a substrate of a Millipore filter type GSWP was used with an average pore size of 0.22 $\mu$m.

This type of filter has previously been manufactured from blended cellulose-esters.

The membranes formed were tested at a system pressure of $50 \times 10^5$ N/m$^2$, a NaCl concentration of 1.5 kg/m$^3$, and a temperature of 20°–25° C.

The formation of foils was carried out as follows:

a. Evaluation of polymer foils of test no. 3

After evaporation of the carbon tetrachloride from the mother liquid, the polymer formed was filtered off and washed with demineralized water and ethyl alcohol. Then the polymer was dispersed in an alcoholic soap solution (0.1 M NaOH and 2g. TEEPOL/l and brought into the reverse osmosis circuit. After five hours of membrane forming, the circuit was rinsed clean for 1 hour with demineralized water, and then NaCl was added to the supply. The following qualities were then determined.
  Salt-retention : 32%
  Flux : $4.9 \times 10^{-5}$ m$^3$/m$^2$s.

TEEPOL is a Trademark for a surfactant which has as active compounds 60–70 parts by weight of alkylbenzene sulphonate and 40–30 parts by weight of polyethylene oxide. These compounds are dissolved in water.

b. Evaluation of polymer foils of test no. 6

After evaporation of the hexane, NaOH was added to the solution to increase the pH to 10 to 11, whereupon the solution was brought to 100° C. Next, the polymer was filtered off and washed with demineralized water. After redispersing in demineralized water, the polymer was brought into the reverse osmosis circuit and NaCl was added. After 2 hours the pH of the circuit liquid was brought up to pH 10 with the aid of NaOH. After 22 hours the following membrane qualities were measured:
  Salt-retention: 38 %
  Flux: $6.8 \times 10^{-5}$ m$^3$/m$^2$/s.

The foils indicated by tests no. 3 and no. 6 were circular. The foils of test no. 3 consisted of foils more than 90% of which had a diameter of 5 to 6 $\mu$m and thickness of 0.2 to 0.3 $\mu$m. With test no. 6, these dimensions were about 150 $\mu$m and 0.9 $\mu$m.

TABLE A

| a | b | c | d | e | | f | g |
|---|---|---|---|---|---|---|---|
| Test No. | Group No.+ | Method | Aqueous phase reactant A | Conc. mol/l | Non-aqueous phase reactant B | Conc. mol/l | Non-aqueous phase | Volume aqueous phase ml |
| 1 | 1,L | 1,4 | piperazine | & 0.05 | terephthaloylchloride | 0.1 | hexane | 2000 |
| 2 | 1,L | 1,4 | diaminoanisol | 0.05 | terephthaloylchloride | 0.1 | hexane | 2000 |
| 3 | 1,L | 1,2 | diamino-ethane | 0.2 | isophthaloylchloride | 0.2 | tetra | 2000 |

TABLE A-continued

| Test No. | | | | | | | | | |
|---|---|---|---|---|---|---|---|---|---|
| 4 | 1,N | I,4 | 3,3'-diaminobenzidine | 0.025 | terephthaloylchloride | 0.2 | benzene | 2000 | |
| 5 | 1,N | I,4 | 3,3'-diaminobenzidine | 0.025 | terephthaloylchloride | 0.2 | hexane | 2000 | |
| 6 | 1,N | I,4 | 3,3'-diaminobenzidine | 0.05 | terephthaloylchloride | 0.1 | hexane | 2000 | |
| 7 | 2,L | I,4 | 2,6-diaminopyridine | 0.05 | oxalylchloride | 0.2 | hexane | 2000 | |
| 8 | 2,L | II,4 | 2,6-diaminopyridine | 0.05 | oxalylchloride | 0.2 | hexane | 2000 | |
| 9 | 3,L | I,4 | 1,4-diaminobenzene | 0.05 | toluenediisocyanate | 0.2 | hexane | 2000 | |
| 10 | 3,L | I,4 | piperazine | 0.05 | toluenediisocyanate | 0.2 | hexane | 2000 | |
| 11 | 3,L | II,4 | 2,6-diaminopyridine | 0.05 | toluenediisocyanate | 0.2 | hexane | 2000 | |
| 12 | 4,L | I,4 | hydrazine | 0.05 | toluenediisocyanate | 0.2 | hexane | 2000 | |
| 13 | 5,L | II,4 | hydroquinone | 0.05 | toluenediisocyanate | 0.2 | hexane | 2000 | |
| 14 | 5,L | II,4 | resorcinol | 0.05 | toluenediisocyanate | 0.2 | hexane | 2000 | |
| 15 | 5,N | II,4 | pyrogallol | 0.05 | toluenediisocyanate | 0.2 | hexane | 2000 | |
| 16 | 6,N | I,4 | D-glucose | 0.025 | terephthaloylchloride | 0.2 | benzene | 2000 | |
| 17 | 6,N | II,4 | pyrogallol | 0.05 | adipoylchloride | 0.2 | tetra | 2000 | |
| 18 | 10,L | I,4 | hydrazine | 0.05 | terephthaloylchloride | 0.2 | benzene | 1000 | |
| 19 | 11,L | I,4 | oxalic acid dihydrazide | 0.05 | terephthaloylchloride | 0.1 | hexane | 2000 | |
| 20 | 11,L | I,4 | oxalic acid dihydrazide | 0.05 | terephthaloylchloride | 0.1 | pentane | 2000 | |
| 21 | 14,I | I,4 | oxalic acid dihydrazide | 0.05 | toluenediisocyanate | 0.2 | hexane | 2000 | |

+ L = linear polymer
N = crosslinked polymer

| a | h | i | j | k | l | m | n | o |
|---|---|---|---|---|---|---|---|---|
| Test No. | Volume non-aqueous phase ml | pH aqueous phase at start | Reaction time min. | Particles size before evaporation μm | RPM tempo-fluid | Acid acceptor conc. mol/l | Buffer conc. mol/l | Remarks |
| & 1 | 100 | & 11.7 | 10 | 28–140 | 2200 | 0.15 $Na_2CO_3$ | | |
| 2 | 100 | 4.6 | 10 | 14–60 | 2200 | | 0.2 acetic acid/ 0.2 sodium acetate | |
| 3 | 50 | 11.7 | 15 | — | 4000 | 0.1 $Na_2CO_3$ | | |
| 4 | 100 | 2 | 10 | 14–140 | 2200 | | | pH with HCl to 2 |
| 5 | 100 | 2 | 10 | 14–140 | 2200 | | | pH with HCl to 2 |
| 6 | 100 | 2.2 | 1 | 50–350 | 1800 | | | pH with HCl to 2.2 |
| 7 | 100 | 11.7 | 10 | 30–150 | 2200 | 0.15 $Na_2CO_3$ | | small yield of polymer |
| 8 | 100 | 8.4 | 10 | 30–90 | 1800 | 0.06 $NaHCO_3$ | | reaction pH = 6 |
| 9 | 100 | 4.6 | 10 | 14–300 | 2200 | | 0.2 acetic acid/ 0.2 sodium acetate | |
| 10 | 100 | 11.7 | 10 | 50–100 | 2200 | 0.15 $Na_2CO_3$ | | |
| 11 | 100 | 8.5 | 10 | 40–150 | 1800 | 0.06 $NaHCO_3$ | | before evaporation already a membrane product |
| 12 | 100 | 11.7 | 10 | 30–70 | 2200 | 0.15 $Na_2CO_3$ | | |
| 13 | 100 | 8 | 10 | 30–100 | 1800 | 0.06 $NaHCO_3$ | | |
| 14 | 100 | 7.7 | 10 | 14–90 | 1800 | 0.06 $NaHCO_3$ | | |
| 15 | 100 | 7.6 | 10 | 80–90 | 1800 | 0.06 $NaHCO_3$ | | |
| 16 | 100 | 11.6 | 10 | 28–140 | 2200 | 0.075 $Na_2CO_3$ | | |
| 17 | 100 | 7.8 | 10 | — | 1800 | 0.06 $NaHCO_3$ | | |
| 18 | 500 | 11.7 | 10 | 40–140 | 2200 | 0.15 $Na_2CO_3$ | | |
| 19 | 100 | 11.7 | 10 | 50–350 | 2200 | 0.15 $Na_2CO_3$ | | |
| 20 | 100 | 9 | 10 | 70 | 2200 | | 0.01 borax + some dr. HCL | |
| 21 | 100 | 11.7 | 10 | 70–80 | 2200 | 0.15 $Na_2CO_3$ | | |

I claim:

1. A process for making thin polymer foils for use in a dynamic membrane which comprises the steps of
    dispersing in water a non-aqueous liquid phase, which phase contains a polymerization reactant B and which phase is substantially immiscible with water and has a boiling point below that of water;
    adding an aqueous solution of a polymerization reactant A, which results in a polymer forming at the interface of the non-aqueous phase and the water, said polymer encapsulating the non-aqueous phase; and
    heating the dispersion to a temperature above the boiling point of the non-aqueous phase but below the boiling point of water, which heating results in rupture of the encapsulating polymer to form a dispersion of thin polymer foils and in evaporation of the non-aqueous phase.

2. Process according to claim 1 characterized in that the dispersion is carried out in such a way that at least 70% of the foils in two perpendicular directions in the plane of the foil have dimensions between 0.1 μm and 1 mm.

3. A process according to claim 2, characterized in that the dimensions of the foils in the plane of the foils are between 1 μm and 1 mm.

4. The process according to claim 2, wherein the dimension of the foils in the direction perpendicular to the plane of the foils is less than 1/10 th the dimensions of the foils in the plane of the foils.

5. The process according to claim 4, wherein the dimensions of the foils in the direction perpendicular to the plane of the foils is 1 μm or smaller.

6. The process according to claim 1, wherein the reactant A is a compound of the formula $R_m (X)_n Y$ wherein X and Y are the same or different and are selected from the group consisting of $-NH_2$, $>NH$, $-NH-E$, $-OH$, $-NHNH_2$, $>N-NH_2$, and $-CO-NH-NH_2$ where E is an alkyl group or an aromatic ring; R is selected from the group consisting of

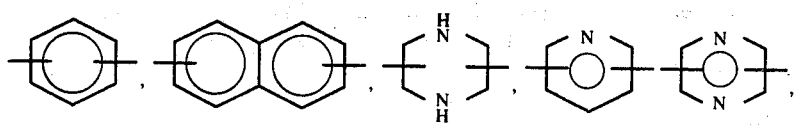

an alkyl group with 1-4 carbon atoms, and

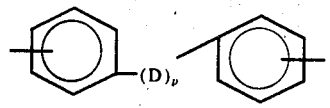

where D is selected from the group consisting of —$CH_2$—, —$SO_2$—, CO—, —NH—, —S—,

and —CHOH— and $p$ is 0 or 1, and where the R cyclic groups can be substituted with a substituent selected from the group consisting of $CH_3$—, $CH_3O$—,

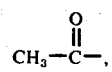

and phenyl; $n$ is 0, 1 or 2 and $m$ is 0 or 1 with the proviso that when $n$ is 0, then $m$ is 1 and R is

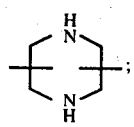

with the further proviso that when $m$ is 0, then $n$ is 1 and X and Y are selected from the group consisting of —$NH_2$, —$NHNH_2$ and —CO—NH—$NH_2$; and wherein reactant B is a compound of the formula $R'_q(Z)_rS$ wherein Z and S are the same or different and are selected from the group consisting of —COCl, —NH-COCl, —N=C=O, and —OCOCl; R' is selected from the group consisting of

Cl, —CH=CH—, and an alkyl group with 1 – 4 carbon atoms where E is methyl or phenyl and the R' cyclic groups can be substituted with a substituent selected from the group consisting of $CH_3$l3 and $CH_3O$—; $q$ is 0 or 1 with the proviso that when $q$ is 0, then $r$ is 1, and Z and S are

and $r$ is 1 or 2.

7. The process according to claim 1, wherein the reactant A is a compound of the formula $R_mX_n$ wherein X is selected from the group consisting of —$NH_2$, >NH, —NH—E, —OH, —$NHNH_2$, >N—$NH_2$ and —CONHNH where E is an alkyl group or an aromatic ring; R is an aromatic group selected from the group consisting of an aromatic ring, two condensed aromatic rings and two aromatic rings linked together by a member selected from the group consisting of —$CH_2$—, —$SO_2$—, —CO—, —NH—, —S—,

and —CHOH—, said aromatic rings containing a maximum of six carbon atoms; $n$ is 2 or 3; and $m$ is 0 or 1; and wherein reactant B is a compound of the formula $R'_qZ_r$ wherein Z is selected from the group consisting of —CO—Cl, —NH—CO—Cl, —N=C=O, and —O—CO—Cl; R' is an aromatic group selected from the group consisting of an aromatic ring, two condensed aromatic rings, and two aromatic rings linked together with a methylene group, said aromatic rings containing a maximum of six carbon atoms; $q$ is 0 or 1; and $r$ is 2 or 3.

8. The process according to claim 1, wherein after the step of heating, the dispersion of thin polymer foils is filtered, washed and redispersed in water.

9. The process according to claim 1, wherein after the step of adding water containing reactant A, the dispersion of the polymer encapsulated non-aqueous phase is filtered, washed and redispersed in water before the step of heating.

10. The process according to claim 9, wherein after the step of heating, the thin polymer foils are filtered, washed and redispersed in water.

11. A process according to claim 1, wherein the water contains a surface active substance.

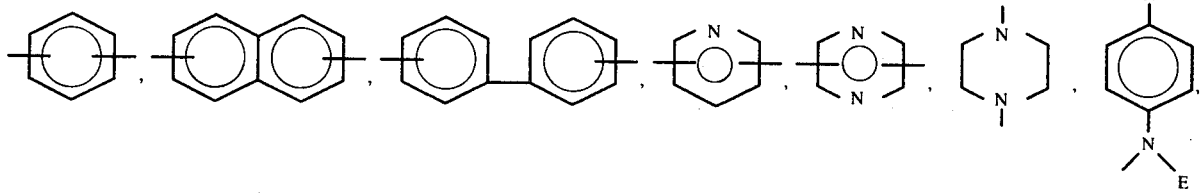

12. A process according to claim 1, wherein the water contains an acid acceptor.

13. A process according to claim 1, wherein the water contains a buffer.

14. A process for making thin polymer foils for use in a dymanic membrane which comprises the steps of dispersing a non-aqueous phase in water, which phase contains a polymerization reactant B, and which non-aqueous phase is substantially immiscible with water and has a boiling point below that of water, which water contains polymerization reactant A, wherein A and B react to form a polymer at the interface of the non-aqueous phase and the water, said polymer encapsulating the non-aqueous phase; and heating the dispersion to a temperature of above the boiling point of the non-aqueous phase but below the boiling point of water, which heating results in rupture of the encapsulating polymer to form a dispersion of thin polymer foils and in evaporation of the non-aqueous phase.

15. The process according to claim 14, wherein dispersion is carried out in such a way that at least 70% of the foils have dimensions between 0.1 μm and 1 mm in two perpendicular directions in the plane of the foils.

16. A process according to claim 15, wherein the dimensions in the plane of the foils are between 1 μm and 1 mm.

17. A process according to claim 15, wherein the dimension of the foils in the direction perpendicular to the plane of the foil is less than 1/10th the dimensions of the foils in the plane of the foils.

18. The process according to claim 17, wherein the dimension of the foils in the direction perpendicular to the plane of the foils is 1 μm or smaller.

19. The process according to claim 14, wherein the reactant A is a compound of the formula $R_m (X)_n Y$ wherein X and Y are the same or different and are selected from the group consisting of $-NH_2$, $>NH$, $-NH-E$, $-OH$, $-NHNH_2$, $>N-NH_2$, and $-CO-N-H-NH_2$ where E is an alkyl group or an aromatic ring; R is selected from the group consisting of

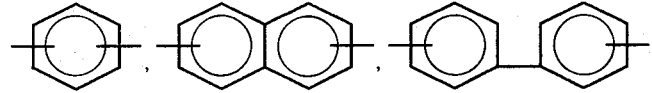

an alkyl group with 1–4 carbon atoms, and

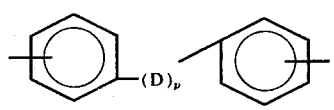

where D is selected from the group consisting of $-CH_2-$, $-SO_2-$, $-CO-$, $-NH-$, $-S-$,

and $-CHOH-$ and p is 0 or 1, and where R cyclic groups can be substituted with a substituent selected from the group consisting of $CH_3-$, $CH_3O-$,

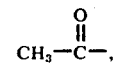

and phenyl; n is 0, 1 or 2 and m is 0 or 1 with the proviso that when n is 0, then m is 1 and R is

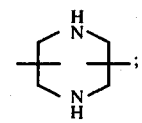

with the further proviso that when m is 0, then n is 1 and X and Y are selected from the group consisting of $-NH_2$, $-NHNH_2$ and $-CO-NH-NH_2$; and wherein reactant B is a compound of the formula $R'_q(Z)_r S$ wherein Z and S are the same or different and are selected from the group consisting of $-COCl$, $-NH-COCl$, $-N=C=O$, and $-OCOCl$; R' is selected from the group consisting of

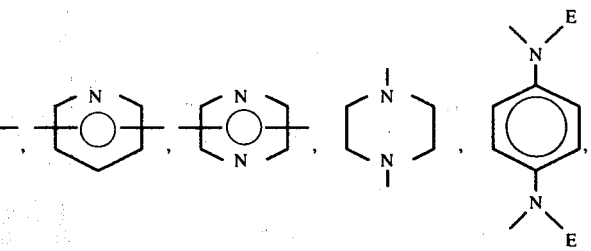

Cl, $-CH=CH-$, and an alkyl group with 1–4 carbon atoms where E is methyl or phenyl and the R' cyclic groups can be substituted with a substituent selected from the group consisting of $CH_3-$ and $CH_3O-$; q is 0 or 1 with the proviso that when q is 0, then r is 1, and Z and S are

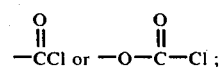

and r is 1 or 2.

20. The process according to claim 14, wherein the reactant A is a compound of the formula $R_mX_n$ wherein X is selected from the group consisting of —NH$_2$, >NH, —NH—E, —OH, >N—NH$_2$ and —CONHNH$_2$ where E is an alkyl group or an aromatic ring; R is an aromatic group selected from the group consisting of an aromatic ring, two condensed aromatic rings, and two aromatic rings linked together by a member selected from the group consisting of —CH$_2$—, —SO$_2$—, —NH—, —S—, —CO—,

and —CHOH—, said aromatic rings containing a maximum of six carbon atoms, $n$ is 2 or 3; and $m$ is 0 or 1; and wherein reactant B is a compound of the formula $R'_qZ_r$ wherein Z is selected from the group consisting of —CO—Cl, —NH—CO—Cl, —N=C=O, and —O—CO—Cl; R' is an aromatic group selected from the group consisting of an aromatic ring, two condensed aromatic rings, and two aromatic rings linked together with a methylene group, said aromatic rings containing a maximum of six carbon atoms; $q$ is 0 or 1; and $r$ is 2 or 3.

21. The process according to claim 14, wherein after the step of heating; the dispersion of thin polymer foils is filtered, washed and redispersed in water.

22. The process according to claim 14, wherein after the step of dispersing the non-aqueous phase containing reactant B in water containing reactant A, the dispersion of the polymer encapsulated non-aqueous phase is filtered, washed and redispersed in water before the step of heating.

23. The process according to claim 22, wherein after the step of heating, the thin polymer foils are filtered, washed and redispersed in water.

24. The process according to claim 14, wherein the water contains a surface active substance.

25. The process according to claim 14, wherein the water contains an acid acceptor.

26. The process according to claim 14, wherein the water contains a buffer.

* * * * *

UNITED STATES PATENT AND TRADEMARK OFFICE
CERTIFICATE OF CORRECTION

PATENT NO. : 3,996,318
DATED : December 7, 1976
INVENTOR(S) : Jan Willem Van Heuven It is certified that error appears in the above-identified patent and that said Letters Patent are hereby corrected as shown below:

Column 8, between lines 12 and 13, add --"Types of interfacial polycondensation products", Y can be a --;
Column 17, line 66, "CH313" should be --$CH_3$- --.
Column 1, line 26, "valve" should be --value--;
Column 10, line 33, "not react" should be --do not react--.

Signed and Sealed this

Nineteenth Day of April 1977

[SEAL]

Attest:

RUTH C. MASON
Attesting Officer

C. MARSHALL DANN
Commissioner of Patents and Trademarks